United States Patent
Bortun et al.

(10) Patent No.: US 6,936,175 B2
(45) Date of Patent: Aug. 30, 2005

(54) ZIRCONIUM PHOSPHATE, HAFNIUM PHOSPHATE AND METHOD OF MAKING SAME

(75) Inventors: Anatoly I. Bortun, Easton, PA (US); Clive J. Butler, Easton, PA (US)

(73) Assignee: Magnesium Elektron, Inc., Flemington, NJ (US)

( * ) Notice: Subject to any disclaimer, the term of this patent is extended or adjusted under 35 U.S.C. 154(b) by 303 days.

(21) Appl. No.: 10/195,876

(22) Filed: Jul. 15, 2002

(65) Prior Publication Data

US 2004/0007532 A1 Jan. 15, 2004

(51) Int. Cl.$^7$ .............................. C01B 25/37; C02F 1/42
(52) U.S. Cl. ...................... 210/681; 210/903; 423/181; 423/308; 423/309; 423/311
(58) Field of Search ................................. 423/308, 309, 423/311, 181; 210/903, 681

(56) References Cited

U.S. PATENT DOCUMENTS

| | | | |
|---|---|---|---|
| 2,349,243 A | | 5/1944 | Bates |
| 3,056,647 A | | 10/1962 | Amphlett |
| 3,130,147 A | | 4/1964 | Dwyer |
| 3,416,884 A | * | 12/1968 | Stynes et al. |
| 3,485,763 A | | 12/1969 | Lefevre et al. |
| 4,025,608 A | | 5/1977 | Tawil et al. |
| 4,381,289 A | | 4/1983 | Nowell et al. |
| 4,512,905 A | | 4/1985 | Clearfield et al. |
| 4,526,765 A | | 7/1985 | Ito et al. |
| 4,695,642 A | | 9/1987 | Derouane et al. |
| 4,806,517 A | | 2/1989 | Vanderpool et al. |
| 4,826,663 A | * | 5/1989 | Alberti et al. ............. 423/308 |
| 6,077,809 A | | 6/2000 | Suzuki et al. |
| 6,326,328 B1 | | 12/2001 | Matsuzawa |
| 6,379,641 B1 | | 4/2002 | Bedard et al. |
| 6,391,278 B1 | | 5/2002 | Pinavaia et al. |

FOREIGN PATENT DOCUMENTS

FR            1317359          1/1963

OTHER PUBLICATIONS

*Synthetic Inorganic Ion Exchangers*, Vesely, V. and Pekarek, V, Talanta 1972, vol. 19, pp. 219–262, no month.
*On the Synthesis of a–Zirconium Phosphate*, Trobajo, Camino et al., Chem. Mater, 2000, vol. 12, pp. 1787–1790, no month.
*Galvanic Cell Type Humidity Sensor with NASICON–Based Material Operative at High Temperature*, Feng et al., Chem. Mater, 1992, vol. 4, pp. 1257–1262, no month.

(Continued)

*Primary Examiner*—Wayne A. Langel
(74) *Attorney, Agent, or Firm*—Pearne & Gordon LLP

(57) ABSTRACT

The invention relates to zirconium phosphate of H form which is characterized by a $^{31}$P NMR spectra comprising peaks at −4.7 ppm, −12.8 ppm and −17.0 ppm (all peaks being in a range of ±0.5 ppm). Also featured is a Na form of the material. The zirconium phosphate material is characterized by a unique surface area, pore size distribution and surface morphology, as well as by an affinity for $NH_4^+$ ions and moisture insensitivity. Also featured is hafnium phosphate characterized by moisture insensitivity. The zirconium phosphate may be amorphous and possess a framework-type structure. The inventive method of making zirconium phosphate includes the steps of heating an aqueous mixture including a zirconium compound and a phosphorous-containing reagent at a temperature of at least 120° C. to form a reaction product, and treating the reaction product with acid at a temperature of at least 60° C.

58 Claims, 6 Drawing Sheets

20 microns

OTHER PUBLICATIONS

*Crystalline insoluble salts of polybasic metals—II. Synthesis of crystalline zirconium or titanium phosphate by direct precipitation*, G, Alberti et al., J. Inorg. Chem., vol. 30, pp. 317–318, 1968, no month.

*P MAS NMR Investigations of Crystalline and Glassy NASICON—Type Phosphates*, K.C. Sobha et al., Journal of Solid State Chemistry, vol. 121, pp. 197–201 (1996), no month.

Amphlett, C.B., *Inorganic Ion Exchangers*, Elsevier Publishing Company, New York, (1964), pp. 92–95, no month.

V.V. Streklo, Abstract Translation of *attached Russian article for Chemistry Role in the Environmental Protection*, Naukova Dumka, Kiev (1982) pp. 179–188, no month.

*Preparation and Sorption Properties of Spherical Polyacrylamide–Zirconium Phosphate Ion–Exchanger.*, Chao–Yeuh Yang et al., Separation Science and Technology, 18(1), pp. 83–91, (1983), no month.

*On the Synthesis of a–Zirconium Phosphate*, Camino Trobajo, et al., Chem. Mater, 2000, 12, 1787–1790, no month.

*Structure of Zirconium phosphate gels produced by the sol–gel method*, S.G. Bogdanov et al., J. Phys.: Codens, Matter 9 (1997), pp. 4031–4039, no month.

*The effect of mineralizers on the crystallization of zirconia gel under hydrothermal conditions*, G Dell'Agli et al., Solid State Ionics 123 (1999) pp. 87–94, no month.

*Preparation of stable, high surface area zirconia*, K.S. Chan et al., J. Mat. Science, 12, N21, 1579–1581 (1994), no month.

*Scientific Bases for the Synthesis of Highly Dispersed Framework Zirconium Phosphate Catalysts for Paraffin Isomerization and Selective Oxidation*, Sadykov et al., Kinetics and Catalysis, vol. 42, No. 3 (2001), pp. 391–398, no month.

*Preparation and Sorption Properties of Spherical Polyacrylamide–Zirconium Phosphate Ion–Exchanger*, Chao–Yeuh Yang et al., Separation Science and Technology, 18(1), pp. 83–91, 1983, no month.

*Sol–gel preparation of nanostructured adsorbents*, Y.S. Lin and S.G. Deng, Adsorption and its Application in Industry and Environmental Protection Studies in Surface Science and Catalysts, vol. 120, pp. 653–686, 1998, no month.

Ion Exchange Properties of Tin (IV) Materials—I Hydrous TIN(IV) Oxide and its Cation Exchange Properties. Donaldson and M.J. Fuller, J. inorg. nucl. Chem., 1968, vol. 30, pp. 1083–1092, no month.

*Preparation and characterisation of mesoporous, high–surface–area zircondium (IV) oxide*, Michael J. Hudson and James A. Knowles, J. Mater. Chem., 1996, 6(1), pp. 89–95, no month.

*Parameter control in the synthesis of ordered porous zirconium oxide*, Han–Rong Chen et al., Materials Letters 51 (Nov. 2001), pp. 187–193.

*Preparation of zirconia powder by the pyrolysis of active carbon*, M. Ozawa and M. Kimura, Journal of Material Science Letters 9 (1990) pp. 446–448, no month.

*Effects of Chemical Species on the Crystallization Behavior of a Sol–Derived Zirconia Precursor*, C.L. Ong et al., J. Am. Ceram. Soc. 81 (10), pp. 2624–2628 (1998), no month.

*Morphology of Zirconia Synthesized Hydrothermally from Zirconium Oxychloride*, Bruno Mottet, et al.., J. Am. Ceram. Soc. 75(9), pp. 2515–2519 (1992), no month.

*Microwave–Hydrothermal Synthesis of Nanocrystalline Zirconia Powders*, Federica Bondioli et al., J. Am. Ceram. Soc., 84(11) , pp. 2728–2730 (2001), no month.

*Highly Ordered Porous Zirconias from Surfactant–Controlled Synthesis: Zirconium Oxide–Sulfate and Zirconium Oxo Phosphate*, Ulrike Ciesla et al., Chem. Mater, 1999, vol. 11, No. 2, pp. 227–234, no month.

*Inorganic Ion Exchange Materials Group IV Hydrous Oxides–Synthetic Inorganic Ion Exchangers, Chapter 5*, Abraham Clearfield, Ph.D, Ed., CBC Press, Inc., 182, pp. 141–160, no month.

*Solid–state Nuclear Magnetic Resonance Spectroscopic Study of γ–Zirconium Phosphate*, Nigel Clayden, J Chem. Soc. Dalton Trans (1987), pp. 1877–1881, no month.

*Influence of Precipitating Agent and Digestion on the Morphology and Microstructure of Hydrous Zirconia*, G.K. Chuah et al., Journal of Catalysis 175, pp. 80–92 (1998) Article No. CA981980, no month.

*Ion Exchange Properties of TIN (IV) Materials–1, Hydrous TIN(IV) Oxide and its Cation Exchange Properties*, J.D. Donaldson et al., J. Inorg. Nucl. Chem., 1968, vol. 30, pp. 1083–1092, no month.

*The Sorptionof First–Row Transition Metal Ions on a Zirconium Phosphate Gel of Low Crystallinity and Study of the Reproducibility of the Gel*, Sten Ahrland et al., J. Inorg. Nucl. Chem, 1970. vol. 32, pp. 2069–2078, no month.

*Direct hydrothermal sysntesis of Zirconium phosphate and Zirconium arsenate with a novel basic layered structure in alkaline media*, Abraham Clearfield, et al., Inorganic Chemistry Communications 1 (1998) pp. 206–208, no month.

*Hydrothermal Synthesis and Characterisation of Crystalline Sodium Zirconium Phosphates*, M.K. Dongare et al., Mat. Res. Bull., vol. 27, pp. 637–645 (1992), no month.

*Hydrothermal Preparation of the Low–expansion NZP Family of Materials*, Sridhar Komarneni, Int. J. High Technology Ceramics 4 (1988) pp. 31–39, no month.

*Zirconium and Hafnium Hydroxo–orthophosphates*, N.G. Chernorukov et al., Russian Journal of Inorganic Chemistry, 28 (7) 1983 pp. unknown, no month.

*Preparation and Characterization of a New 3–Dimensional Zirconium Hydrogen Phosphate, r–Zr(HPO$_4$)$_2$–Determination of the Complete Crystal Structure Combining Synchrotron X–ray Single–Crystal Diffraction and Neutro Powder Diffraction*, Anne Marie Krogh Andersen, Inorg. Chem 1998, 37, pp. 876–881, no month.

*Proton Conductivity and Humidity–Sensing Properties at High Temperature of the NASICON–Based Composite Material HZr$_2$P$_3$O$_{12}$ZrP$_2$O$_7$*, Shouhua Feng et al., Chem. Mater, 1993, 5, pp. 1277–1282, no month.

*Zirconium Deficiency in Nasicon–Type Compounds: Crystal Structure of Na$_3$Zr(PO$_6$)$_3$*, J.P.Boilot et al., Journal of Solid State Chemistry, 50, pp. 91–99, (1983), no month.

*Synthesis of Semicrystalline Materials by Organic Compound Intercalation into Amorphous Titanium Phosphate*, Anatoly Bortun and V.V. Strelko, Chem Mater, 1995, 7, pp. 249–251, no month.

$^{31}$*P–MASNMR–Spectroscopic Studies with Zirconium Phosphate Catalysts*, Koh–Ichi Segawa et al., Journal of Catalysis 101 pp. 81–89 (1986), no month.

*P Solid–State NMR Studies of the Structure of Amine–Intercalated a–Zirconium Phosphate. Reaction of a–Zirconium Phosphate with Excess Anline*, D.J. MacLachlan, J. Phys. Chem. 1990, 94, pp. 7656–7661, no month.

*Structure of the Active Sites on $H_3PO_6/ZrO_2$ Catalysis for Dimethyl Carbonate Synthesis From Menthanol and Carbon Dioxide*, Yoshiki Ikeda et al., J. Phys. Chem B 2001, 105, pp. 10653–10658, no month.

Zirconium Phosphates, Abraham Clearfield, Inorganic Ion Exchange Materials, Chapter 1, pp. 1–74, no date.

*A Novel Layered Zirconium Phosphate $Zr_2O_3(HPO_4)$. Synthesis and Characterization of Properties*, Anatoly Bortun et al., no date.

Solvent Extraction and Ion Exchange, 15(2), pp. 305–328 (1997), no month.

*Synthesis and Study of New Compounds $(M^1)(N^{IV})2(PO_4)_3$ with Nasicon–Like Structure* (M=AG. Cu; N=Ge H, Sn, Ti, Zr), J.M. Winand et al., Journal of Solid State Chemistry 107, (1993), pp. 356–361, no month.

*Preparation of Porous Resin Loaded with Crystalline Hydrous Zirconium Oxide and its Application to the Removal of Arsenic*, T. M. Suzuki et al., Reactive & Functional Polymers 43 (2000), 165–172, no month.

*Hydrothermal Preparation of the Low–Expansion NZP Family of Materials*, Sridhar Komarneni, Int. J. High Technology Ceramics 4 (1988), pp. 21–39, no month.

*The Preparation of Crystalline Zirconium Phosphate and Some Observations on its Ion Exchange Behavior*, A. Clearfield and J.A. Stynes, J. Inorg. Nucl. Chem., vol. 26, 1964, pp. 117–129, no month.

*New Crystalline Phases of Zirconium Phosphate Possessing Ion–Exchange Properties*, A. Clearfield et al., J. Inorg. *Nucl. Chem.*, 1968, vol. 30, pp. 2249–2258, no month.

*Uptake of Inorganic Acids on Hydrogels of Tetravalent Hydroxides and its Application for the Preparation of Some Inorganic Sorbents*, R. Galetka et al., Journal of Radioanalytical Chemistry, vol. 30 (1976), pp. 155–172, no month.

* cited by examiner 20 microns 20 microns 20 microns

US 6,936,175 B2

ZIRCONIUM PHOSPHATE, HAFNIUM PHOSPHATE AND METHOD OF MAKING SAME

FIELD OF THE INVENTION

The present invention relates to zirconium phosphate, hafnium phosphate and a method of making the same and, in particular, to zirconium phosphate for use in ion exchange and catalysis.

BACKGROUND OF THE INVENTION

Ion exchange technologies are widely used for water and waste treatment, in areas such as hydrometallurgy, biochemistry, medicine and environmental protection. Ion exchange efficiency depends on many factors, the principal one being the selectivity of the exchanger in use. Inorganic ion exchangers and adsorbents, due to such properties as chemical and thermal stability, resistance to oxidation, and unique selectivity to certain ions, have definite advantages in comparison with traditionally used organic resins. Inorganic ion exchangers are able to operate in extreme conditions (high temperature or strong radiation fields, in the presence of organic solvents and/or oxidants and in a great excess of competitive ions), in which organic resins fail to work efficiently. Zirconium phosphate (ZrP) inorganic adsorbents have been studied in detail. Zirconium phosphates can be amorphous or crystalline. Zirconium phosphates, as generally known and defined herein, have the general formula $ZrO_2 \cdot nP_2O_5 \cdot mH_2O \cdot (xMO)$, where $n=0–1.0$, $m>0$, $x=0–1.0$, $M$=metal ion.

A conventional method of amorphous zirconium phosphate preparation includes reaction between aqueous solutions of a zirconium salt and phosphoric acid or its salts with formation of a gelatinous precipitate, filtering the precipitate, washing and drying. The final product after drying is a fine powder or granules with irregular form.

Depending on the experimental conditions (e.g., pH, temperature, duration) and composition of the reaction mixture, a P/Zr ratio in the final product can vary in a broad range from ~0 up to 2.0. The presence of phosphorus-containing functional groups (e.g., $HPO_4$, $H_2PO_4$) provides cation exchanger properties to zirconium phosphates. Some amorphous zirconium phosphates have a high affinity towards transition metals and heavy alkali ions. However, amorphous zirconium phosphates synthesized via such a precipitation route have several drawbacks which include:

strong dependency between ion exchange performance and moisture content, which suggests loss of capacity and deterioration of kinetics of sorption with the loss of water during storage or under drying;
  low thermal stability; and
  poor mechanical and hydrodynamic properties of the sorbents (powders, granules of irregular form), preventing use in column type applications.

Amorphous zirconium phosphates in powdered form can be granulated with the use of organic or inorganic binders. This approach allows the production of mechanically strong ion exchangers in the form of beads or extrudates of desired shape suitable for column applications. However, use of binders affects total ion exchange capacity, kinetics of adsorption and makes some specific limitations on zirconium phosphate applications due to solubility of the binder and possibility of additional contamination of the product.

Granulated amorphous zirconium phosphates without binders can be prepared via sol-gel or gel routes. The sol-gel granulation process based on the oil-drop principle includes conversion of a $ZrO_2$ sol into spherical granules of hydrous zirconium oxide gel in organic water-immiscible media, followed by conversion into zirconium phosphate by treatment of the $ZrO_2$ gel with phosphoric acid or a phosphoric acid salt (R. Caletka, M. Tympl, J. Radioanal. Chem., 30: 155 (1976)). The gel method, also based on the oil-drop principle, may include reaction between aqueous solutions of zirconium salt and phosphoric acid (or its salt) in the presence of Zr-complexing reagent ($H_2O_2$, polyatomic alcohols, organic oxyacids) which allows a direct formation of zirconium phosphate gel (Amphlett, C. B. Inorganic Ion Exchangers. Elsevier, N.Y. (1964); Spherically granulated zirconium phosphate sorbents prepared via sol-gel and gel routes have high crush strength and good attrition resistance. However, they still have drawbacks of a strong dependency between ion exchange performance and moisture content, as well as low thermal stability.

A method of making granulated zirconium phosphate is described in U.S. Pat. No. 4,025,608. According to this method zirconium phosphate is made by the reaction of a zirconium salt, having a predetermined particle size, with phosphoric acid or a phosphate in a liquid medium. The zirconium phosphate made according to this patent has drawbacks of a strong dependency between ion exchange performance and moisture content, as well as low thermal stability.

Crystalline zirconium phosphates can be prepared by treatment of amorphous zirconium phosphates in the presence of excess $H_3PO_4$ at elevated temperature for a long period of time. (A. Clearfield, J. A. Stynes, J.Inorg.Nucl.Chem., v.26, 117, 1964) or by reaction between aqueous solutions of a zirconium salt and phosphoric acid to form a gel and then heating the dry gel in water under hydrothermal conditions (M. K. Dongare et al, Mat.Res-.Bull. v.27, 637–645, 1992) and also via solid state reactions between $ZrO_2$ or Zr salts and salts of phosphoric acid (J. M. Winand et al, J.Solid State Chem., 107, 356 (1993)).

Depending on the experimental conditions and the compositions used, various crystalline forms of zirconium phosphate, both layered and framework, have been reported. Among them are hydrated materials like $\alpha$-$Zr(HPO_4)_2$ $H_2O$ (A. Clearfield, J. A. Stynes, J.Inorg.Nucl.Chem., v.26, 117, 1964), $\gamma$-$Zr(H_2PO_4)(PO_4)$ $2H_2O$ (A. Clearfield et al, J.Inorg.Nucl.Chem., v.30, 2249, 1968), $\tau$-$Zr(HPO_4)_2$ $H_2O$ (A. M. K. Andersen et al, Inorg.Chem., v.37, 876–881, 1998, $\psi$-$Zr_2O_3(HPO_4)$ $nH_2O$ (A. Clearfield et al, Inorg.Chem.Comm., 1, 208 (1998), $HZr_2(PO_4)_3$ $H_2O$ (S. Feng, M. Greenblatt, Chem.Mater., v.4, 1257, 1992), or non-hydrated materials like $MZr_2(PO_4)_3$, $MZr_5(PO_4)_7$ (M. K. Dongare et al, Mat.Res.Bull. v.27, 637–645, 1992), $M_5Zr(PO_4)_3$ (J. P. Boilot et al, J.Solid State Chem., 50, 91 (1983), $ZrP_2O_7$, $Zr(OH)PO_4$ (N. G. Chernorukov et al, J.Inorg.Chem., v.28, 934 (1984). Some of the crystalline zirconium phosphates contain exchangeable ions ($H^+$ or metal cations) and show ion exchange properties. The selectivity of crystalline materials strongly depends on the type of crystal structure and, in some cases, is much higher than that of amorphous compounds. Another advantage of crystalline materials is that they are less susceptible to moisture content than amorphous sorbents and, as result, are more thermally stable. Among disadvantages of crystalline ion exchangers are poor kinetics of adsorption and powdered form, preventing their use in column applications.

SUMMARY OF THE INVENTION

In general, the present invention features zirconium phosphate of H form which is characterized by a $^{31}P$ NMR spectra comprising peaks at −4.7 parts per million (ppm), −12.8 ppm and −17.0 ppm, or of Na form characterized by a $^{31}$P NMR spectra comprising peaks at −2.5 ppm, −9.2 ppm and −13.3 ppm (all peaks being in a range of ±0.5 ppm). The preferred zirconium phosphate of the invention has the formula: $ZrO_2.nP_2O_5.mH_2O.(xMO)$, where n=0–1.0, m>0, x=0–1.0, M=metal ion.

In particular, the zirconium phosphate comprises a surface area of at least 10 m$^2$/g, in particular 50 m$^2$/g and, more specifically, at least 300 m$^2$/g. A pore size distribution of the zirconium phosphate ranges from R=20 to 40 Å, where R is the pore diameter. The zirconium phosphate is amorphous and, while not wanting to be bound by theory, has a framework-type structure. The zirconium phosphate does not exhibit X-ray diffraction peaks after intercalation with large or long organic amines. The material has a unique morphology. It comprises hexagonal-shaped openings ranging in size from 50 to 500 nm. An ion exchanger, catalyst or catalyst support may comprise the inventive zirconium phosphate.

One aspect of the inventive zirconium phosphate material is that it exhibits an affinity towards $NH_4^+$ ions which is characterized by a Kd value of at least 120 ml/g, in particular 120 to 160 ml/g, and an ion exchange capacity of at least 0.70 mMol $NH_4^+$/g, in particular 0.70 to 0.80 mMol $NH_4^+$/g, from a physiological solution simulant. The material also exhibits an affinity towards $K^+$ or $Cs^+$ ions which is characterized by a Kd value of at least 120 ml/g, in particular 120 to 160 ml/g, and an ion exchange capacity of at least 0.70 mMol $NH_4^+$/g, in particular 0.70 to 0.80 mMol $K^+$ or $Cs^+$/g, from a physiological solution simulant.

Another aspect of the zirconium phosphate material is its stability against moisture loss. The stability against moisture loss is characterized by a capacity and Kd value for $NH_4^+$ ions from a physiological simulant solution, which do not decrease more than 20% (and even not more than 5%) across a moisture content LOD of the zirconium phosphate ranging from 0≦LOD≦18% across a temperature range of up to 200° C. The capacity is at least 0.70 mMol $NH_4^+$/g and the Kd value is at least 120 mL/g for $NH_4^+$ ions from a physiological simulant solution. Hafnium phosphate of the present invention (having the formula $HfO_2.nP_2O_5.mH_2O.(xMO)$, where n=0–1.0, m>0, x=0–1.0, M=metal ion) is also believed to possess the same stability against moisture loss.

The inventive zirconium phosphate may be described as amorphous and, while not wanting to be bound by theory, as having a framework-type structure. Porous inorganic materials can be fully amorphous, semi-crystalline or crystalline. Amorphous materials do not possess long range order, whereas crystalline materials do. This can be seen in X-ray diffraction patterns in which non-crystalline materials do not exhibit sharp XRD peaks. Semi-crystalline materials may exhibit some chemical structure ordering as shown by broad XRD peaks. The zirconium phosphate of the present invention is amorphous, meaning as defined herein, that it has a chemical structure ranging from fully amorphous (no detectable XRD peaks) to semi-crystalline (as determined by the existence of broad peaks), but not crystalline (lack of sharp XRD peaks). More specifically, amorphous is defined herein by having an XRD pattern in which a height of a peak above baseline across 2θ values ranging from 5 to 40 degrees ranges up to 300 counts and, in particular, from 40 to 150 counts. The XRD pattern of FIG. 2a is used as a reference to define the amorphous character of the inventive material. The inventive material has a framework-type structure. The inventive material does not exhibit XRD peaks upon intercalation with n-butylamine (i.e., peak intensity not greater than 150) and thus, possesses a framework, rather than a layered, structure (FIG. 2b). However, being amorphous, the inventive material does not possess a fully framework structure.

In general, a method of making the inventive zirconium phosphate, comprises heating an aqueous mixture comprising a zirconium compound and a phosphorous-containing reagent at a temperature of at least 120° C. to form a reaction product. The reaction product is treated with acid at a temperature of at least 60° C.

More specific features of the inventive method will now be described. In the inventive method it is especially suitable to form the aqueous mixture by combining a suspension of the zirconium compound and an aqueous solution of the phosphorus-containing reagent. A pH of the solution ranges from 3.0 to 6.0. A concentration of phosphate ions in the solution ranges from 0.05 to 2.0 M. The zirconium compound may have a particle size ranging from 50 to 60 microns. The heating step is conducted at a temperature ranging from 120 to 170° C. for 1 to 18 hours. In particular, the heating step may be carried out at autogenous pressure (e.g., not in excess of 100 psi). The reaction product is treated with acid in an amount that forms an acid/Zr molar ratio of 0.1 to 2.0. The treating step is carried out at a temperature ranging from 80 to 100° C. for 1 to 3 hours. Following the step of treating the reaction product with acid, the method comprises neutralizing the reaction product and removing zirconium phosphate from the solution. The neutralizing is conducted using a basic reagent comprising a compound selected from the group consisting of NaOH, $NaHCO_3$, $Na_2CO_3$ and combinations thereof. The neutralized zirconium phosphate is removed from solution and dried at a temperature ranging from 100 to 200° C., and more particularly, for 6 to 8 hours.

Referring now to substances suitable for use in the inventive method, the acid is selected from the group consisting of HCl, $HNO_3$, $H_2SO_4$, HBr, HClO, $HClO_4$, $CH_3COOH$, CHOOH and combinations thereof. The zirconium compound comprises a water insoluble salt selected from the group consisting of zirconium basic sulfate, zirconium basic carbonate, hydrous zirconium oxide, hydrous zirconium phosphate and combinations thereof. The following zirconium compounds may also be suitable for use in the present invention: zirconium tetrachloride, zirconium oxychloride, zirconium acetate, zirconium nitrate, ammonium zirconium carbonate, zirconium sulfate, zirconium phosphate, potassium zirconium carbonate and combinations thereof.

The phosphorus-containing reagent comprises at least one of phosphoric acid and a salt of phosphoric acid (e.g., comprising a salt selected from the group consisting of sodium, potassium and ammonium salts of phosphoric acid). In one aspect of the invention, the aqueous mixture comprises soluble silica. The term silica is used in a broad sense to mean compounds containing silicon. In particular, the soluble silica comprises a compound selected from the group consisting of sodium metasilicate, sodium orthosilicate, colloidal silica and combinations thereof. Especially suitable is a phosphorus-containing reagent comprising a mixture of the phosphoric acid or salt thereof and the soluble silica. A Si/P molar ratio of the phosphorous-containing reagent ranges from 0.01 to 0.25. A (P+Si)/Zr molar ratio of the mixture ranges from 0.2 to 2.2.

One aspect of the inventive method of making zirconium phosphate comprises heating the aqueous mixture comprising a water insoluble zirconium compound and the phosphorous-containing reagent at a temperature of at least 120° C. at autogenous pressure not exceeding 100 psi to form the reaction product. The reaction product is treated with acid at a temperature of at least 60° C. The reaction product is neutralized and then removed from the solution by filtration. All of the specific features of the method described above may be used in this aspect of the inventive method.

Another aspect of the inventive method of making zirconium phosphate, comprises reacting the suspension comprising the water insoluble zirconium compound and the solution comprising the phosphorous-containing reagent at a temperature ranging from 120 to 170° C. at autogenous pressure not exceeding 100 psi for 1 to 18 hours to form the reaction product. The reaction product is treated with acid in an amount that forms an acid/Zr molar ratio of 0.1 to 2.0 at a temperature ranging from 60 to 100° C. for 1 to 3 hours. The reaction product is neutralized with a basic reagent to produce a solution having a pH ranging from 6 to 8. The neutralized zirconium phosphate is removed from solution and dried at a temperature ranging from 100 to 200° C., and more particularly, for 6 to 8 hours. All of the specific features of the method described above may be used in this aspect of the inventive method.

Another aspect of the invention features zirconium phosphate made according to the general method, wherein the zirconium phosphate is of H form, characterized by a $^{31}$P NMR spectra comprising peaks at −4.7 parts per million (ppm), −12.8 ppm and −17.0 ppm, or of Na form characterized by a $^{31}$P NMR spectra comprising peaks at −2.5 ppm, −9.2 ppm and −13.3 ppm (all peaks being in a range of ±0.5 ppm).

Yet another aspect of the invention is an efficient method of removing $NH_4^+$ ions from a liquid by ion exchange, comprising contacting a liquid comprising $NH_4^+$ ions with zirconium phosphate ion exchange material and removing the $NH_4^+$ ions from the liquid with the ion exchange material to a high affinity characterized by a Kd value of at least 120 ml/g and/or an ion exchange capacity of at least 0.70 mMol $NH_4^+$/g from a physiological solution simulant.

Still another aspect of the invention is an efficient method of removing $K^+$ or $Cs^+$ ions from liquid by ion exchange, comprising contacting a liquid comprising $K^+$ or $Cs^+$ ions with zirconium phosphate ion exchange material and removing the $K^+$ or $Cs^+$ ions from the liquid with the ion exchange material to a high affinity characterized by a Kd value of at least 120 ml/g and/or an ion exchange capacity of at least 0.70 mMol $K^+$ or $Cs^+$/g from a physiological solution simulant.

The inventive zirconium phosphate and method of making it differ from prior art zirconium phosphate and methods. For example, the zirconium phosphate disclosed in U.S. Pat. No. 4,025,608 is made by reacting an insoluble zirconium salt having a predetermined particle size distribution, with phosphoric acid or phosphate at 80° C. for 1 hour. This is followed by additional conversion of the product into the sodium form. The zirconium phosphate prepared by this route has a lower capacity and affinity for ammonium ions than the sorbent of the current invention and shows a pronounced dependency between ion exchange performance and moisture content in the solid (FIG. 5). Moreover, the '608 patent material is microporous, with low surface area (<1–2 m$^2$/g).

The inventive zirconium phosphate offers advantages compared to prior art materials. Being inorganic, the inventive ion exchange material is able to operate in extreme conditions (high temperature or strong radiation fields, in the presence of organic solvents and/or oxidants and in a great excess of competitive ions), in which organic resins fail to work efficiently. The inventive material avoids drawbacks associated with amorphous zirconium phosphates synthesized via a precipitation route. The inventive material does not suffer from a strong dependency between ion exchange performance and moisture content, low thermal stability, or poor mechanical and hydrodynamic properties and thus, is suitable for column-type applications. The inventive material may have a granular form without the need for organic or inorganic binders, which adversely affect total ion exchange capacity, kinetics of adsorption and makes some specific limitations on zirconium phosphate applications due to solubility of binder and possibility of additional contamination of the product. The inventive material avoids the disadvantages of crystalline ion exchangers: poor kinetics of adsorption and powdered form.

Other features, details and advantages of the invention will be apparent from the attached drawings and detailed description that follows.

DETAILED DESCRIPTION

Figure 1:
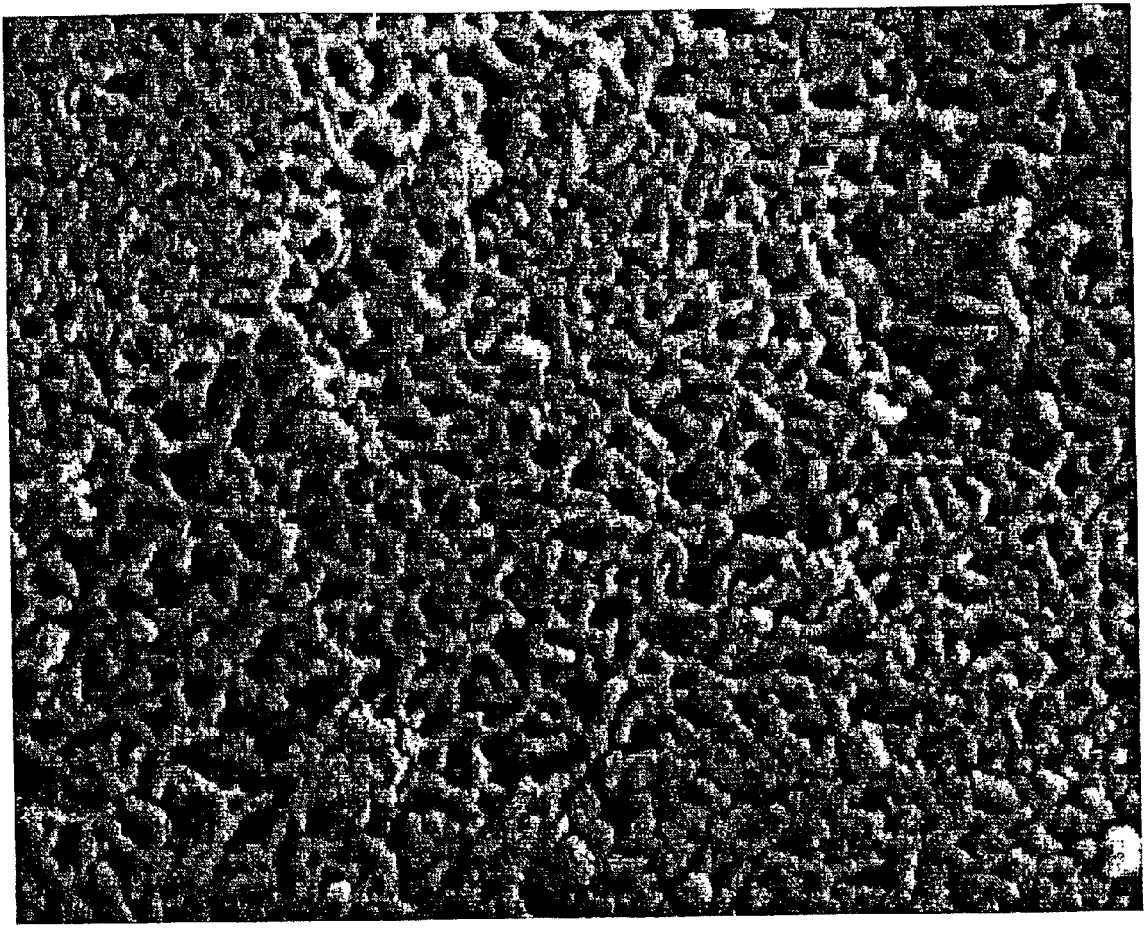
FIG. 1 is an SEM micrograph of the inventive zirconium phosphate under magnification 25,000.

The inventive zirconium phosphate is amorphous and is believed to have a framework-type structure. In preferred form, the zirconium phosphate has the formula $ZrO_2.nP_2O_5.mH_2O.(xMO)$, where n=0–1.0, m>0, x=0–1.0, M=metal ion. The inventive zirconium phosphate has a predetermined particle size distribution in the range of 50 to 60 microns. It exhibits cation exchange properties, possesses sufficiently high ion exchange capacity and shows a high selectivity towards $NH_4^+$ ions as well as $K^+$ and $Cs^+$ ions. It also has a unique surface morphology, which provides the adsorbent with a high surface area (50–300 m$^2$/g) and a narrow mesopore size distribution (R=20–40 Å). The inventive zirconium phosphate has pores or openings ranging from irregularly shaped to hexagonal or substantially-hexagonal shaped having a size ranging from 50 to 200 nm (FIG. 1), which is not believed to have been disclosed in connection with amorphous or crystalline zirconium phosphates. The zirconium phosphate of the current invention is characterized by a P/Zr molar ratio in the solid ranging from 1.7–1.8:1. Only trace amounts of silicon are present in the compound.

While not wanting to be bound by theory, the inventive material is believed to have three kinds of phosphorus-containing functional groups, based on solid state $^{31}$P NMR. The peaks in $^{31}$P NMR spectra, located at −4.7 ppm, −12.8 ppm and −17.0 ppm (ratio 1:2:1) for the proton form of the zirconium phosphate and at −2.5 ppm, −9.2 ppm and −13.3 ppm (ratio 1:2:1) for the sodium form of the zirconium phosphate (all peaks being in a range of ±0.5 ppm), do not correspond to phosphorus peak positions in any known layered or framework zirconium phosphates (see Table 1). While not wanting to be bound by theory, the downshifts of all peak positions, when the H-form of the material is converted into the sodium form, indicate that all three types of phosphorus atoms belong to the ion exchangeable groups, $H_2PO_4$ or $HPO_4$.

TABLE 1

Peak positions in solid state $^{31}$P NMR spectra of zirconium phosphates

| Compound | Signal, ppm | Reference |
|---|---|---|
| α-Zr(HPO$_4$)$_2$ H$_2$O | −18.7 | N. J. Clayden, Chem. Soc. Dalton. Trans., 1877, 1987 |
| α-Zr(NaPO$_4$)$_2$ H$_2$O | −14.6 & −15.9 | D. J. MacLachlan, K. R. Morgan, J. Phys. Chem., v. 94, 7656, 1990 |
| γ-Zr(H$_2$PO$_4$)(PO$_4$) 2H$_2$O | −9.4 & −27.4 | N. J. Clayden, Chem. Soc. Dalton. Trans., 1877, 1987 |
| τ-Zr(HPO$_4$)$_2$ H$_2$O | −23.7 | A. M. K. Andersen et al, Inorg. Chem., v. 37, 876–881, 1998 |
| ψ-Zr$_2$O$_3$(HPO$_4$) nH$_2$O | −11.8 | A. I. Bortun et al, Solv. Extr. Ion. Exch., v. 15, 305, 1997 |
| ψ-Zr$_2$O$_3$(NaPO$_4$) nH$_2$O | −8.8 | A. I. Bortun et at, Solv. Extr. Ion. Exch., v. 15, 305, 1997 |
| NaZr$_2$(PO$_4$)$_3$, | −24.7 | M. K. Dongare et al, Mat. Res. Bull. v. 27, 637–645, 1992 |
| NaZr$_5$(PO$_4$)$_7$ | −8.4, −20.1 & −24.5 | M. K. Dongare et al, Mat. Res. Bull. v. 27, 637–645, 1992 |
| Zirconium phosphate Gel | −11.8, −19.3 & −25.3 | K. Segawa, Y. Nakajima, J. Catal., v. 101, 81, 1986 |
| Zirconium phosphate Gel | −14.3, −20.8 & −26.8 | Y. Ikeda et al., J. Phys. Chem., B, v. 105, 10653, 2001 |
| Novel ZrP, H-form | −4.7, −12.8 & −17.0 | Present invention |
| Novel ZrP, Na-form | −2.5, −9.2 & −13.3 | Present invention |

Figure 2A:
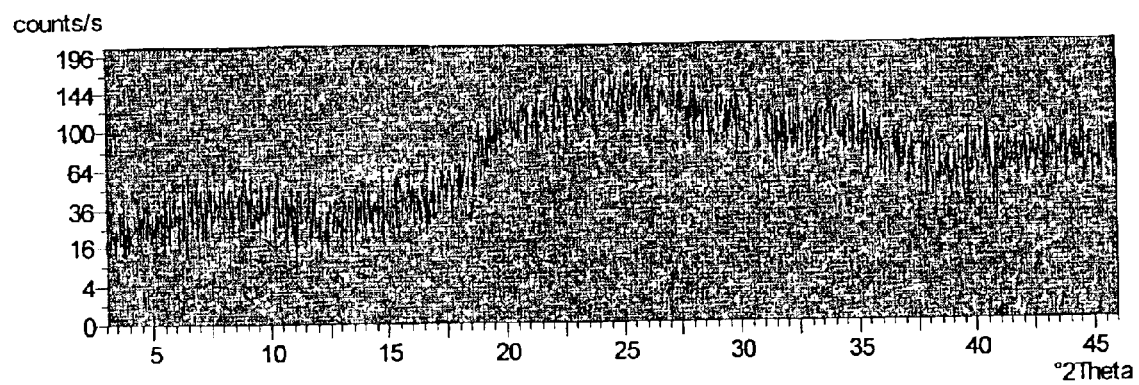
FIG. 2 are X-ray diffraction patterns for the inventive amorphous zirconium phosphate (FIG. 2a) and its product of reaction with n-butylamine (FIG. 2b)
Figure 2B:
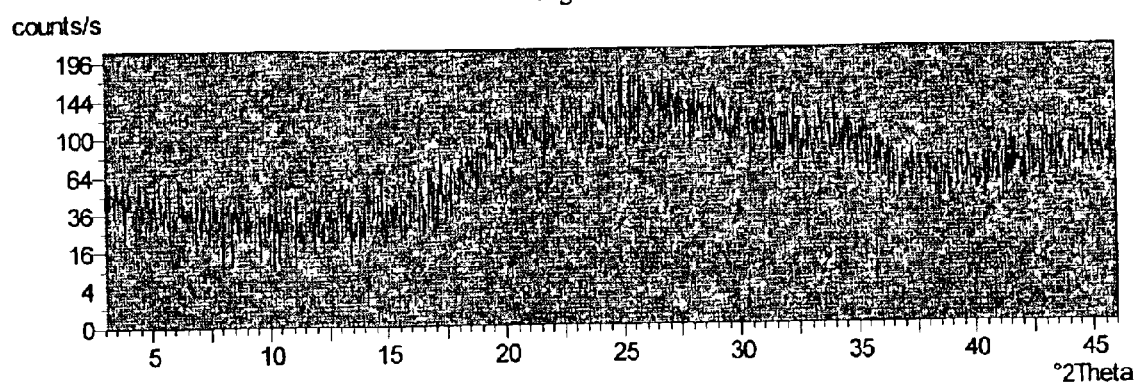

The inventive amorphous zirconium phosphate unexpectedly has a framework type structure. Amorphous gel precipitates have a quasi-layered structure of α-ZrP type (extremely small crystallites with poor ordering) (S. G. Bogdanov et al, J.Phys.-Condensed Matter, 9, 4039 (1997); C. Trabajo et al, Chem.Mater., 12, 1790 (2000)). This has been shown for iso-structural amorphous titanium phosphates (A. Bortun, et al., Chem. Mat., v.7, 249–251, 1995). Bortun et al. found that amorphous titanium phosphate easily reacts with n-alkylamine vapors forming organic intercalates, which have a more ordered (i.e., "semicrystalline") structure than the initial compound. According to X-ray diffraction the intercalation products have a layered structure. In contrast, the inventive amorphous zirconium phosphate also reacts with n-alkylamine vapors, but does not form quasi-layered intercalates. As a result, there are no observable differences in the XRD patterns of the initial compound and the product of reaction with n-butylamine (FIG. 2). The n-butylamine intercalate was prepared by contacting the ZrP in its H-form with n-butylamine vapors, saturated in a closed volume for 4 days. The same n-butylamine intercalate can be prepared starting from the Na-form. However, in this case it should be contacted with a 0.1 M aqueous solution of n-butylamine HCl salt. While not wanting to be bound by theory, this indicates that the inventive zirconium phosphate has a framework-type structure, which is believed to be responsible for unique ion exchange properties and moisture resistance of this sorbent.

The present method of making zirconium phosphate is practical from an industrial standpoint and has advantages over known methods of zirconium phosphate synthesis. For example, to prepare zirconium phosphate with a developed surface area and narrow pore size distribution in the mesoporous range sol-gel synthesis in the presence of bulky organic molecules (surfactants) is typically used. The inventive process includes heating the suspension of the zirconium compound with the aqueous solution of the phosphorus-containing reagent in an autoclave at elevated temperature. The choice of zirconium compound with an average granule size of 50 to 60 microns permits producing zirconium phosphate-based adsorbent with a similar particle size distribution. This particle size distribution is ideally suited (low back pressure, quick kinetics of exchange) for some separation applications, such as ammonia removal from biological liquors under column conditions. The processing conditions of the invention permit making granulated amorphous zirconium phosphate with a developed surface area and porosity, high affinity towards $NH_4^+$ ions and resistance to thermal treatment.

The inventive zirconium phosphate is formed by a process that includes reacting a suspension of a zirconium compound, preferably having a predetermined particle size, with an aqueous solution of phosphorus-containing reagent in an autoclave at a temperature of at least 120° C., preferably from 120 to 170° C. for 1 to 18 hours, at autogeneous pressure not in excess of 100 psi, to produce a reaction product. The reaction product is treated with acid such as at least one of HCl, HNO$_3$, H$_2$SO$_4$, HBr, HClO, HClO$_4$, CH$_3$COOH, in an amount that forms an acid/Zr molar ratio of 0.1 to 2.0 at a temperature ranging from 60 to 100° C., more particularly from 80 to 100° C., for 1 to 3 hours. The treatment with acid at elevated temperature is believed to allow stabilization of the adsorbent's structure by a mild "aging" in acid media. As a result, the mesoporous structure of the zirconium phosphate becomes more robust and resistant to temperature treatment. Moreover, acid treatment improves the chemical stability of the sorbent by reducing phosphate release in acid and neutral media. Once reacted to obtain the H-form of the inventive zirconium phosphate, the product is filtered and washed. Other suitable reagents and reaction conditions will be apparent to those of ordinary skill in the art in view of the instant disclosure.

If desired, the novel zirconium phosphate may be reslurried and converted to a sodium or other desirable form, such as a potassium form. The zirconium phosphate may be converted into the sodium form by neutralizing with a basic reagent to a pH ranging from 6 to 8 and thereafter filtered, washed with water and dried, preferably at a temperature ranging from 100 to 200° C. for 1 to 18 hours. Thereafter, the sorbent is ready for direct application or storage.

Suitable basic reagents for conversion to the sodium form include NaOH, NaHCO$_3$ and Na$_2$CO$_3$. Similarly, KOH may be used to convert the compound to the potassium form. Conversion to these and other forms, and suitable reagents therefore, will be apparent to those of ordinary skill in the art in view of the present disclosure. It will also be apparent to those of ordinary skill in the art from the present disclosure that selection of any particular form over another will depend on the desired application. For example, use in sodium containing solutions will generally dictate the use of the sodium form in order to avoid unnecessary contamination of the solution with other ions. Similarly, for removal of admixtures from potassium containing solutions, the potassium form may be preferable. Likewise, the H-form can be used in environments where acidification is not an issue. It will be well within the level of skill in the art to select the preferred form for any given application environment in view of the present disclosure.

Referring now to suitable compounds used in the present method, the zirconium compound comprises at least one of zirconium basic sulfate, zirconium basic carbonate, hydrous zirconium oxide, hydrous zirconium phosphate zirconium tetrachloride, zirconium oxychloride, zirconium acetate, zirconium nitrate, ammonium zirconium carbonate, zirconium sulfate, zirconium phosphate, potassium zirconium carbonate. The zirconium compound is preferably water insoluble. In this regard, especially suitable zirconium compounds are zirconium basic sulfate, zirconium basic carbonate, hydrous zirconium oxide and hydrous zirconium phosphate. These are amorphous compounds with a framework-type structure. A predetermined particle size distribution of the zirconium compound ranges from 50 to 60 microns.

The phosphorus-containing reagent comprises at least one of phosphoric acid and at least one of a sodium, potassium or ammonium salt of phosphoric acid. In one aspect of the invention, the aqueous mixture comprises soluble silica comprising at least one of sodium metasilicate, sodium ortho-silicate and colloidal silica. Especially suitable is a phosphorus-containing reagent comprising a mixture of the phosphoric acid or salt thereof and the soluble silica having a molar ratio of Si/P ranging from 0.01 to 0.25, with a pH ranging from 3.0 to 5.0. The (P+Si)/Zr molar ratio of the aqueous mixture ranges from 0.2 to 2.2. The phosphate ion concentration in the solution ranges from 0.05 M to 2.0 M. In particular, the acid/Zr molar ratio ranges from 0.1 to 2.0.

The soluble silica may play a special role. It is well known that silicon easily incorporates into zirconium phosphate forming zirconium silico-phosphates (U.S. Pat. Nos. 4,512,905 and 4,526,765). However, while not wanting to be bound by theory it is believed that under the inventive process conditions silicon interacts with the zirconium phosphate matrix without being incorporated into it, and inhibits crystallization of the conversion product.

Figure 3A:
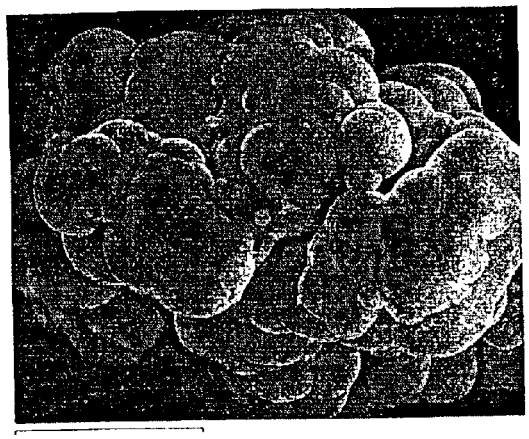
FIG. 3 are SEM micrographs of zirconium basic sulfate (FIG. 3a) and a product of its conversion into the inventive zirconium phosphate (FIG. 3b) under magnification 2,000.
Figure 3B:

Process conditions for hydrothermal treatment in the current invention (temperature, type of reagents, reagent concentrations and molar ratios, duration etc.) are chosen to provide efficient conversion of starting material into amorphous zirconium phosphate without destroying particle size integrity, as illustrated by the SEM micrographs of FIG. 3. Typically crystalline zirconium phosphates with sub-micron particles are formed under hydrothermal conditions. The unexpected formation of the inventive amorphous zirconium phosphate is the result of the process conditions used in the present invention.

Experimental Equipment

This describes the equipment used in the following examples to characterize the inventive zirconium phosphate material of the present invention. Powder X-ray diffraction measurements were carried out in a Phillips diffractometer, model PW 1729/1720 (scan speed 1 degree/minute, step width 0.04 degree, Cu Ka radiation, $\lambda=1.5418$ E). Particle size distribution (PSD) was measured using Leeds-Northrup, Microtrack X100. BET surface area measurements and pore size determination were done on Coulter SA 3100, nitrogen adsorption. Samples were degassed at 280° C. in a vacuum. Water loss was determined at 209° C. on a Denver Instrument hot plate. Residual sulfur content was determined by Sulfur & Carbon analyzer LECO SC-444. Ammonium ion content in solution was determined by the indophenol method at $\lambda=690$ nm at Beckman DU 65 instrument. 31P NMR spectra of solids at magic angle were obtained with a Brucker MSL-300 spectrometer.

The present invention will now be described by the following examples which are provided for the purpose of illustration and are not intended to limit the present invention as defined in the appended claims.

EXAMPLE 1

Amorphous zirconium phosphate was prepared in all the examples. In this example the material was prepared according to the following procedure. In the first stage, a slurry containing 440 g of basic zirconium sulfate (40% $ZrO_2$) (MEI, HCP PP142A), with a predetermined particle size distribution ranging from 50 to 60 microns, in a phosphorus-containing solution was made. The phosphorus-containing solution had the following composition: 3.3 kg of water, 402 g of 75 wt % $H_3PO_4$, 380 g of 30 wt % NaOH and 45 g of $Na_4SiO_4$. The slurry was transferred into an autoclave, sealed and heated at 160° C. for 3 hours under constant stirring. The resulting product of conversion was filtered, washed with 0.5 kg of water and re-slurried in 2 L of 1 M $H_2SO_4$. The zirconium phosphate slurry in sulfuric acid was heated to the boiling point and kept at this temperature for 1 hour. After cooling down, the zirconium phosphate was filtered, washed with 0.5 kg of water and re-slurried in 1 L of water. To the ZrP suspension a 30 wt % NaOH solution was added gradually for 30 to 40 minutes to raise the pH to 7.0. Then, the zirconium phosphate was filtered, washed with 1 kg of water and dried at 150° C. for 12 hours in air.

Figure 4:
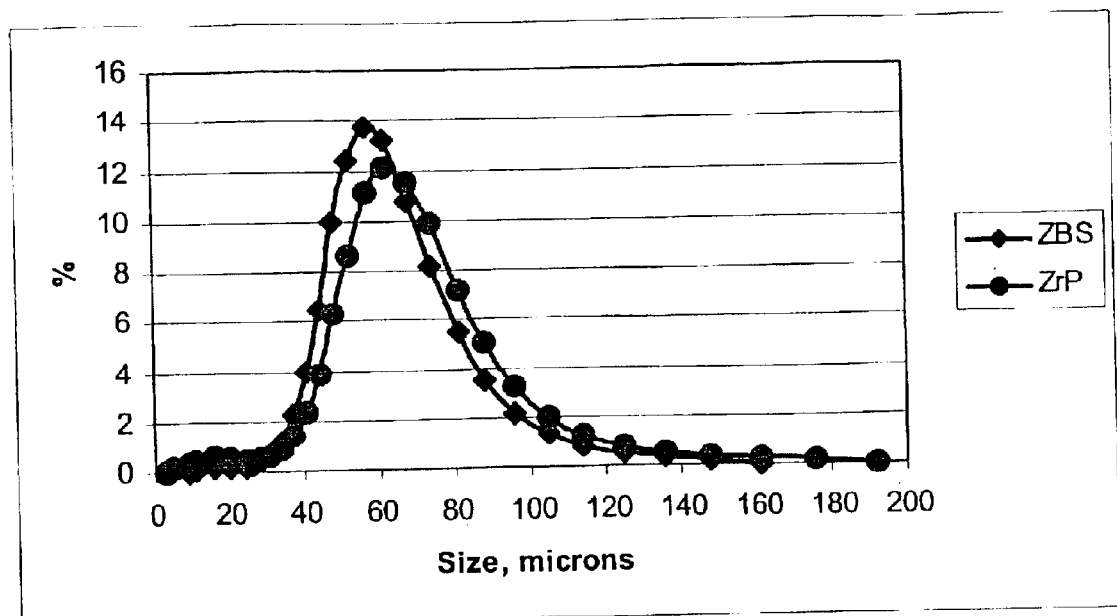
FIG. 4 shows particle size distribution of a basic zirconium sulfate reactant (ZBS) and a product of its conversion into the inventive amorphous zirconium phosphate (ZrP)

The dried product was amorphous zirconium phosphate (sodium form in all examples) with a particle size similar to that of the initial basic zirconium sulfate (FIG. 4). According to elemental analysis the P/Zr molar ratio in the solid was 1.8:1. The silicon content was <0.2 wt %. The surface area was 260 $m^2/g$. The average pore size was R=30 Å. Water loss at 209° C. (LOD) was <1 wt %.

Ion exchange properties of the amorphous zirconium phosphate were tested under column conditions. Five grams of the sodium zirconium phosphate were put into a vertical column with an inner diameter of 8 mm. A physiological simulant solution (97 mMol NaCl, 35 mMol Na lactate, 1.75 mMol $CaCl_2$, 0.75 mMol $MgCl_2$ and 7.0 mMol $NH_4Cl$) was passed through the adsorbent bed at a flow rate ranging from 120 to 130 mL/hour (about 25 bed volumes/hour) with the use of a peristaltic pump. The concentration of $NH_4^+$ ions in solution (before and after passing the adsorbent layer) was determined. The breakthrough curves were plotted as residual concentration of ions in solution (in %) versus amounts of bed volumes (BV) of solution passed through the adsorbent.

Figure 5A:
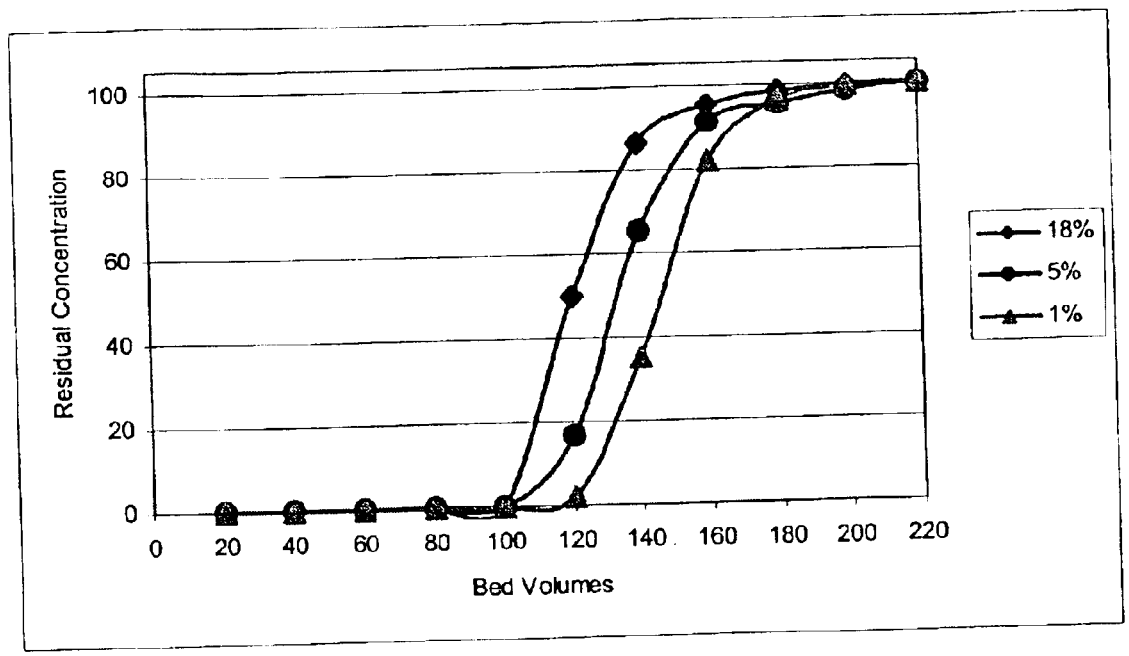
FIG. 5 shows $NH_4^+$ removal from simulant solution as a function of residual moisture content by inventive amorphous zirconium phosphate prepared according to Example 1 (FIG. 5a) and by prior art zirconium phosphate (FIG. 5b)
Figure 5B:
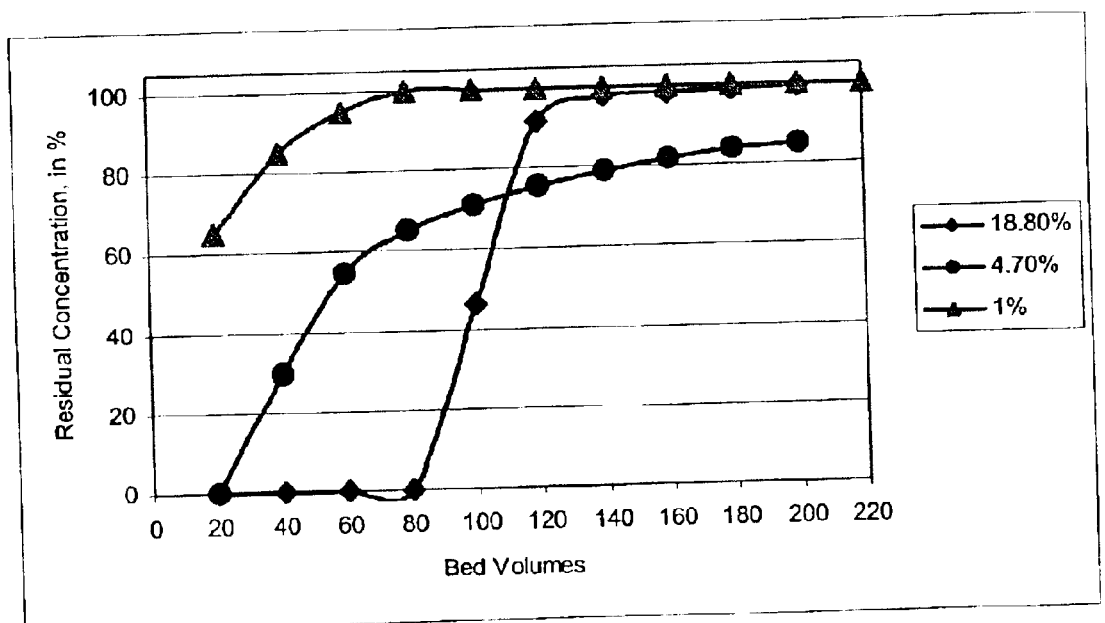
Figure 6:
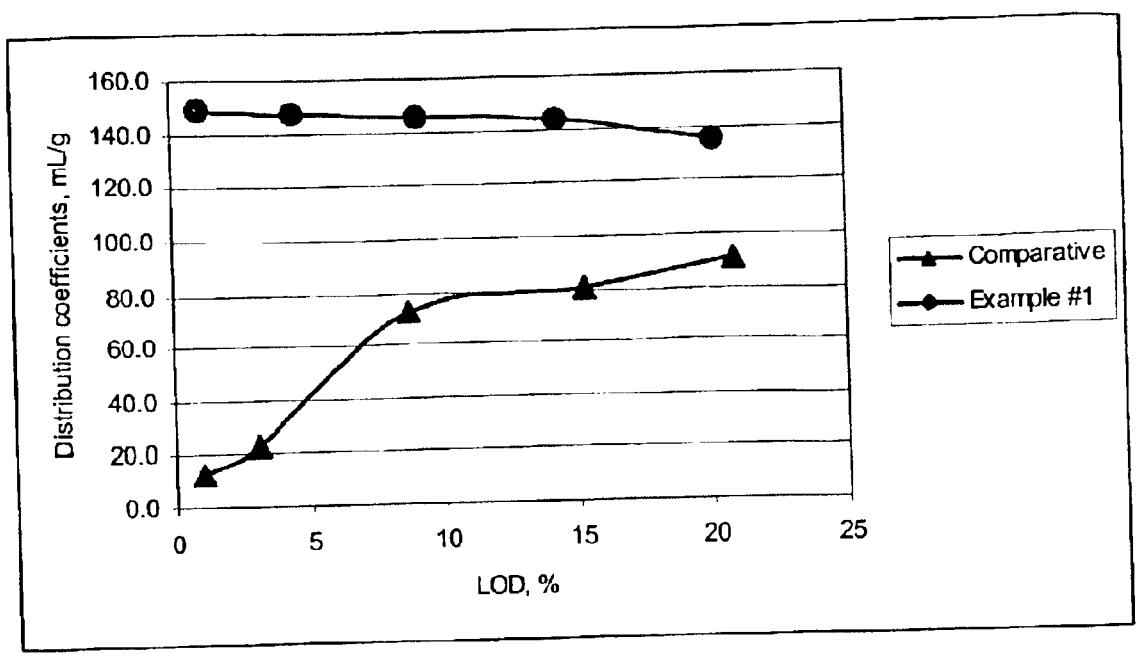
FIG. 6 shows Kd values for $NH_4^+$ ion removal from physiological solution simulant as a function of residual moisture content in the inventive amorphous zirconium phosphate prepared according to Example 1 and by prior art zirconium phosphate.

In FIG. 5a ammonium breakthrough curves for a novel amorphous zirconium phosphate prepared according to Example 1, but dried to different residual moisture contents (LOD=18%, 5% and 1%) are shown. For comparison, ammonium breakthrough curves for zirconium phosphate (Reference sorbent) made according to U.S. Pat. No. 4,025,608, Example 2 and dried to LOD 18, 5 and 1% are also presented (FIG. 5b). The data show that the ammonium uptake by the Comparative sorbent depended strongly on the residual moisture content. Drying of the Comparative sorbent resulted in a loss of capacity and selectivity to $NH_4^+$ ions. In contrast, the ion exchange performance of the inventive zirconium phosphate was relatively insensitive to moisture content. Ion exchange capacity even increases somewhat with a loss of water content when dried from LOD 18% to LOD <1%, which suggests high thermal stability. Moreover, the total ion exchange capacity (IEC) of the inventive material in "dry" form (LOD~1%)–0.77 mMol NH4/g, was almost 50% higher than for the "wet" (LOD~18%) Comparative sorbent. Selectivity of the inventive product and zirconium phosphate made according to U.S. Pat. No. 4,025,608, Example 2, both dried to different LOD, towards $NH_4^+$ ion was determined under static condition from the same physiological simulant. In all experiments volume to sorbent's mass ratio V:m=100:1 (mL/g) and a contact time was 48 hours. The distribution coefficient values were calculated according to the formula: $K_d=(C_o-C_i/C_i) \cdot V/m$, where $C_o$ is initial concentration in solution, $C_i$ is concentration after equilibration with adsorbent, V is volume in mL, m is mass of exchanger in grams; and are presented in FIG. 6. The data show that inventive zirconium phosphate at LOD ~20% has higher selectivity towards $NH_4^+$ ion that comparative material (130 mL/g versus 90 mL/g). Moreover, its selectivity does not deteriorate with the loss of moisture content (at LOD <1% Kd=150 mL/g), whereas the Kd values for Comparative material drop significantly and at LOD <1% Kd=12 mL/g.

EXAMPLE 2

The same operations and amounts of reagents used in Example 1 were used in this example, with the only difference being that the hydrothermal treatment was carried out at 130° C. for 18 hours. The dried product had a particle size distribution ranging from 50 to 60 microns. According to elemental analysis the P/Zr molar ratio in the solid was 1.8:1. The silicon content was <0.2%. The surface area was 140 m²/g. The average pore size was 30 Å. Water loss at 209° C. (LOD) was <1%.

EXAMPLE 3

The same operations and amounts of reagents used in Example 1 were used in this example, with the only difference being that concentration of phosphate ion in the phosphorus-containing reagent was two times higher. The dried product had a particle size distribution ranging from 50 to 60 microns. According to elemental analysis the P/Zr molar ratio in the solid was 1.8:1. The silicon content was <0.2%. The surface area was 70 m²/g. The average pore size was 20 Å. Water loss at 209° C. (LOD) was <1%.

EXAMPLE 4

The same operations and amounts of reagents used in Example 1 were used in this example, with the only difference being that the amount of $Na_4SiO_4$ used was 5 g. The dried product had a particle size distribution ranging from 50 to 60 microns. According to elemental analysis the P/Zr molar ratio in the solid was 1.8:1. The silicon content was <0.1%. The surface area was 110 m²/g. The average pore size was 30 Å. Water loss at 209° C. (LOD) was <1%.

EXAMPLE 5

The same operations and amounts of reagents used in Example 1 were used in this example, with the only difference being that 430 g of 30 wt % NaOH was used and that instead of $Na_4SiO_4$ an equivalent amount of $Na_2SiO_3$ was used. The dried product had a particle size distribution ranging from 50 to 60 microns. According to elemental analysis the P/Zr molar ratio in the solid was 1.7:1. The silicon content was <0.2%. The surface area was 80 m²/g. The average pore size was 40 Å. Water loss at 209° C. (LOD) was <1%.

EXAMPLE 6

The same operations and amounts of reagents used in Example 1 were used in this example, with the only difference being that 430 g of 30 wt % NaOH was used and that instead of $Na_4SiO_4$ an equivalent amount of silica sol as in Example 5 was used. The dried product had a particle size distribution ranging from 50 to 60 microns. According to elemental analysis the P/Zr molar ratio in the solid was 1.7:1. The silicon content was <0.2%. The surface area was 60 m²/g. The average pore size was 40 Å. Water loss at 209° C. (LOD) was <1%.

EXAMPLE 7

The same operations and amounts of reagents used in Example 1 were used in this example, with the only difference being that the zirconium phosphate removed from the autoclave was re-slurried in 2 L of 0.1 M $H_2SO_4$. The dried product had a particle size distribution ranging from 50 to 60 microns. According to elemental analysis the P/Zr molar ratio in the solid was 1.8:1. The silicon content was <0.2%. The surface area was 240 m²/g. The average pore size was 30 Å. Water loss at 209° C. (LOD) was <1%.

EXAMPLE 8

The same operations and amounts of reagents used in Example 1 were used in this example, with the only difference being that zirconium phosphate removed from the autoclave is re-slurried in 2 L of 0.1 M $HNO_3$. The dried product had a particle size distribution ranging from 50 to 60 microns. According to elemental analysis the P/Zr molar ratio in the solid was 1.8:1. The silicon content was <0.2%. The surface area was 220 m²/g. The average pore size was 30 Å. Water loss at 209° C. (LOD) was <1%.

EXAMPLE 9

The same operations and amounts of reagents used in Example 1 were used in this example, with the only difference being that the zirconium phosphate removed from the autoclave was re-slurried in 2 L of 0.1 M HCl. The dried product had a particle size distribution ranging from 50 to 60 microns. According to elemental analysis the P/Zr molar ratio in the solid was 1.8:1. The silicon content was <0.2%. The surface area was 230 m²/g. The average pore size was 30 Å. Water loss at 209° C. (LOD) was <1%.

EXAMPLE 10

The same operations and amounts of reagents used in Example 1 were used in this example, with the only difference being that the zirconium phosphate was converted into the sodium form using $Na_2CO_3$ solution. The dried product had a particle size distribution ranging from 50 to 60 microns. According to elemental analysis the P/Zr molar ratio in the solid was 1.8:1. The silicon content was <0.2%. The surface area was 200 m²/g. The average pore size was 30 Å. Water loss at 209° C. (LOD) was <1%.

EXAMPLE 11

Amorphous zirconium phosphate was prepared as follows. In the first stage, a slurry containing 440 g of hydrated zirconium phosphate (40% by wt $ZrO_2$, P/Zr=1.9:1), with a predetermined particle size ranging from 50 to 60 microns, in a phosphorus-containing solution was made. The phosphorus-containing solution had the following composition: 3.7 kg of water, 38 g of 75 wt % $H_3PO_4$, 110 g of 30 wt % NaOH and 50 g of 30 wt % silica sol. The slurry was transferred into an autoclave, sealed and heated at 160° C. for 3 hours under constant stirring. After that the product of conversion was filtered, washed with 0.5 kg of water and re-slurried in 2 L of 0.5 M $H_2SO_4$. The zirconium phosphate slurry in sulfuric acid was heated to the boiling point and kept at this temperature for 1 hour. After cooling down, the zirconium phosphate was filtered, washed with 0.5 kg of water and re-slurried in 1 L of water. To the ZrP suspension 10% $Na_2CO_3$ solution was added gradually for 30 to 40 minutes to raise the pH to 7.0. Then, the zirconium phosphate was filtered, washed with 1 kg of water and dried at 150° C. for 12 hours in air.

The dried product had a particle size ranging from 50 to 60 microns. According to elemental analysis the P/Zr molar ratio in the solid was 1.9:1. The silicon content was <0.1%. The surface area was 300 m²/g. The average pore size was 30 Å. Water loss at 209° C. (LOD) was <1%.

Although the present invention has been described with reference to the examples and with some degree of particularity in the detailed description, it should be understood that various modifications and variations can be made by those skilled in the art without departing from the spirit and scope of the invention as set forth hereafter in the appended claims.

What is claimed is:

1. Zirconium phosphate of H form which is characterized by a $^{31}P$ NMR spectra comprising peaks at −4.7 ppm, −12.8 ppm and −17.0 ppm, each of said peaks being in a range of ±0.5 ppm.

2. The zirconium phosphate of claim 1 comprising a surface area of at least 10 m²/g.

3. The zirconium phosphate of claim 1 comprising a surface area of at least 50 m²/g.

4. The zirconium phosphate of claim 1 comprising a surface area of at least 300 m²/g.

5. The zirconium phosphate of claim 1 comprising a pore size distribution ranging from R=20 to 40 Å.

6. The zirconium phosphate of claim 1 wherein said zirconium phosphate is amorphous.

7. The zirconium phosphate of claim 1 wherein said zirconium phosphate does not exhibit X-ray diffraction peaks having an intensity greater than 150 counts after intercalation with n-butylamine.

8. The zirconium phosphate of claim 1 comprising hexagonal-shaped openings ranging in size from 50 to 500 nm.

9. The zirconium phosphate of claim 1 wherein said zirconium phosphate exhibits an affinity towards $NH_4^+$ ions characterized by a Kd value of at least 120 ml/g from a physiological solution simulant.

10. The zirconium phosphate of claim 1 wherein said zirconium phosphate exhibits an affinity towards $NH_4^+$ ions characterized by an ion exchange capacity of at least 0.70 mMol $NH_4^+$/g from a physiological solution simulant.

11. The zirconium phosphate of claim 1 wherein said zirconium phosphate exhibits an affinity towards $K^+$ or $Cs^+$ ions characterized by a Kd value of at least 120 ml/g from a physiological solution simulant.

12. The zirconium phosphate of claim 1 wherein said zirconium phosphate exhibits an affinity towards $K^+$ or $Cs^+$ ions characterized by an ion exchange capacity of at least 0.70 mMol $K^+$ or $Cs^+$/g from a physiological solution simulant.

13. Zirconium phosphate of H form which is characterized by a $^{31}P$ NMR spectra comprising peaks at −4.7 ppm, −12.8 ppm and −17.0 ppm, each of said peaks being in a range of ±0.5 ppm, wherein said zirconium phosphate comprises a surface area of at least 50 m²/g, is amorphous and does not exhibit X-ray diffraction peaks having an intensity greater than 150 counts after intercalation with n-butylamine.

14. Zirconium phosphate of Na form which is characterized by a $^{31}P$ NMR spectra comprising peaks at −2.5 ppm, −9.2 ppm and −13.3 ppm, each of said peaks being in a range of ±0.5 ppm.

15. An ion exchanger, catalyst or catalyst support comprising the zirconium phosphate of claim 1.

16. An ion exchanger, catalyst or catalyst support comprising the zirconium phosphate of claim 14.

17. A method of making amorphous zirconium phosphate, comprising the steps of heating an aqueous mixture comprising a zirconium compound and a phosphorous-containing reagent at a temperature of at least 120° C. to form a reaction product, and treating said reaction product with acid at a temperature of at least 60° C., wherein said steps are carried out effective to form said amorphous zirconium phosphate.

18. The method of claim 17 wherein following said step of treating said reaction product with acid, said method comprises neutralizing said reaction product and removing zirconium phosphate from said solution.

19. The method of claim 17 wherein following said step of treating said reaction product with acid, said method comprises neutralizing said reaction product and removing zirconium phosphate from said solution, and wherein said neutralizing is conducted using a basic reagent selected from the group consisting of NaOH, $NaHCO_3$, $Na_2CO_3$ and combinations thereof.

20. The method of claim 17 wherein said heating step is carried out at autogenous pressure.

21. The method of claim 17 wherein said heating step is carried out at autogenous pressure that does not exceed 100 psi.

22. The method of claim 17 wherein said zirconium phosphate after being removed from the solution is dried at a temperature ranging from 100 to 200° C.

23. The method of claim 17 wherein said acid is selected from the group consisting of HCl, $HNO_3$, $H_2SO_4$, HBr, HClO, $HClO_4$, $CH_3COOH$, CHOOH and combinations thereof.

24. The method of claim 17 wherein said zirconium compound comprises a compound selected from the group consisting of zirconium basic sulfate, zirconium basic carbonate, hydrous zirconium oxide, hydrous zirconium phosphate, zirconium tetrachloride, zirconium oxychloride, zirconium acetate, zirconium nitrate, ammonium zirconium carbonate, zirconium sulfate, zirconium phosphate, potassium zirconium carbonate and combinations thereof.

25. The method of claim 17 wherein said zirconium compound comprises a salt selected from the group consisting of zirconium oxide, zirconium sulfate, zirconium basic sulfate, zirconium phosphate and combinations thereof.

26. The method of claim 17 wherein said zirconium compound has a particle size ranging from 50 to 60 microns.

27. The method of claim 17 wherein said phosphorus-containing reagent comprises phosphoric acid, a salt of phosphoric acid and combinations thereof.

28. The method of claim 17 wherein said phosphorus-containing reagent comprises phosphoric acid, a salt of phosphoric acid and combinations thereof, and wherein said salt of phosphoric acid comprises a salt selected from the group consisting of sodium, potassium and ammonium salts of phosphoric acid.

29. The method of claim 17 wherein said aqueous mixture comprises soluble silica.

30. The method of claim 17 wherein said aqueous mixture comprises soluble silica, and wherein said soluble silica comprises a compound selected from the group consisting of sodium metasilicate, sodium ortho-silicate, colloidal silica and combinations thereof.

31. The method of claim 17 wherein said aqueous mixture comprises soluble silica, and wherein a Si/P molar ratio of said phosphorous-containing reagent ranges from 0.01 to 0.25.

32. The method of claim 17 wherein said aqueous mixture comprises soluble silica, and wherein a (P+Si)/Zr molar ratio of said aqueous mixture ranges from 0.2 to 2.2.

33. The method of claim 17 comprising forming said aqueous mixture by combining a suspension of said zirconium compound and an aqueous solution of said phosphorus-containing reagent.

34. The method of claim 17 comprising forming said aqueous mixture by combining a suspension of said zirconium compound and an aqueous solution of said phosphorus-containing reagent, wherein a pH of said solution ranges from 3.0 to 6.0.

35. The method of claim 17 comprising forming said aqueous mixture by combining a suspension of said zirconium compound and an aqueous solution of said phosphorus-containing reagent, wherein a concentration of phosphate ions in said solution ranges from 0.05 to 2.0 M.

36. The method of claim 17 comprising treating said reaction product with acid in an amount that forms an acid/Zr molar ratio of 0.1 to 2.0 and drying at a temperature of 100 to 200° C. for 6 to 8 hours.

37. The method of claim 17 wherein said heating step is conducted at a temperature ranging from 120 to 170° C. for 1 to 18 hours and said treating step is carried out at a temperature ranging from 80 to 100° C. for 1 to 3 hours.

38. A method of making amorphous zirconium phosphate, comprising the steps of:
heating an aqueous mixture comprising a water insoluble zirconium compound and a phosphorous-containing reagent at a temperature of at least 120° C. at autogenous pressure not exceeding 100 psi to form a reaction product;
treating said reaction product with acid at a temperature of at least 60° C.;
neutralizing said reaction product; and
filtering, washing and drying said reaction product, wherein said steps are carried out effective to form said amorphous zirconium phosphate.

39. The method of claim 38 wherein said phosphorus-containing reagent comprises a mixture of a salt of phosphoric acid and soluble silica.

40. The method of claim 38 wherein said phosphorus-containing reagent comprises a mixture of a salt of phosphoric acid and soluble silica, and wherein said soluble silica comprises a compound selected from the group consisting of sodium metasilicate, sodium ortho-silicate, colloidal silica and combinations thereof.

41. The method of claim 38 wherein said phosphorus-containing reagent comprises a mixture of a salt of phosphoric acid and soluble silica, and wherein a Si/P molar ratio of said phosphorous-containing reagent ranges from 0.01 to 0.25.

42. The method of claim 38 wherein said phosphorus-containing reagent comprises a mixture of a salt of phosphoric acid and soluble silica, and wherein a (P+Si)/Zr molar ratio in said aqueous mixture ranges from 0.2 to 2.2.

43. The method of claim 38 comprising forming said aqueous mixture by combining a suspension comprising said zirconium compound and an aqueous solution comprising said phosphorus-containing reagent, wherein a pH of said aqueous solution ranges from 3.0 to 6.0 and a concentration of phosphate ions in said aqueous solution ranges from 0.05 to 2.0 M.

44. The method of claim 38 wherein said reaction product is treated with acid in an amount that forms an acid/Zr molar ratio of 0.1 to 2.0 and said drying is conducted at a temperature ranging from 100 to 200° C. for 6 to 8 hours.

45. A method of making amorphous zirconium phosphate, comprising the steps of:
heating a suspension comprising a water insoluble zirconium compound and an aqueous solution comprising a phosphorous-containing reagent at a temperature ranging from 120 to 170° C. at autogenous pressure not exceeding 100 psi, for 1 to 18 hours to form a reaction product;
treating said reaction product with acid in an amount that forms an acid/Zr molar ratio of 0.1 to 2.0 at a temperature ranging from 60 to 100° C. for 1 to 3 hours;
neutralizing said reaction product with a basic reagent to produce a solution having a pH ranging from 6 to 8; and
drying said neutralized zirconium phosphate at a temperature ranging from 100 to 200° C. for 1 to 18 hours, wherein said steps are carried out effective to form said amorphous zirconium phosphate.

46. Amorphous zirconium phosphate made according to the method of claim 17 wherein said zirconium phosphate is of H form characterized by a $^{31}$P NMR spectra comprising peaks at −4.7 ppm, −12.8 ppm and −17.0 pm, each of said peaks being in a range of ±0.5 ppm.

47. Amorphous zirconium phosphate made according to the method of claim 17 wherein said zirconium phosphate is of Na form characterized by a $^{31}$P NMR spectra comprising peaks at −2.5 ppm, −9.2 ppm and −13.3 ppm, each of said peaks being in a range of ±0.5 ppm.

48. An efficient method of removing $NH_4^+$ ions from a liquid, comprising contacting a liquid comprising $NH_4^+$ ions with zirconium phosphate material and removing the $NH_4^+$ ions from the liquid with said material to a high affinity characterized by a Kd value of at least 120 ml/g from a physiological solution simulant which does not decrease more than 20% across a moisture content LOD of said zirconium phosphate ranging from $0 \leq LOD \leq 18\%$ across a temperature range of up to 200° C.

49. An efficient method of removing $NH_4^+$ ions from a liquid, comprising contacting a liquid comprising $NH_4^+$ ions with zirconium phosphate material and removing the $NH_4^+$ ions from the liquid with said material to a high affinity characterized by a capacity of at least 0.70 mMol $NH_4^+$/g from a physiological solution simulant which does not decrease more than 20% across a moisture content LOD of said zirconium phosphate ranging from $0 \leq LOD \leq 18\%$ across a temperature range of up to 200° C.

50. An efficient method of removing $K^+$ or $Cs^+$ ions from liquid, comprising contacting a liquid comprising $K^+$ or $Cs^+$ ions with a zirconium phosphate material and removing the $K^+$ or $Cs^+$ ions from the liquid with said material to a high affinity characterized by a Kd value of at least 120 ml/g from a physiological solution simulant which does not decrease more than 20% across a moisture content LOD of said zirconium phosphate ranging from $0 \leq LOD \leq 18\%$ across a temperature range of up to 200° C.

51. An efficient method of removing $K^+$ or $Cs^+$ ions from liquid, comprising contacting a liquid comprising $K^+$ or $Cs^+$ ions with zirconium phosphate material and removing the $K^+$ or $Cs^+$ ions from the liquid with said material to a high affinity characterized by a capacity of at least 0.70 mMol $K^+$ or $Cs^+$/g from a physiological solution simulant which does not decrease more than 20% across a moisture content LOD of said zirconium phosphate ranging from $0 \leq LOD \leq 18\%$ across a temperature range of up to 200° C.

52. Zirconium phosphate having stability against moisture loss, wherein said stability against moisture loss is characterized by a capacity and Kd value for $NH_4^+$ ions from a physiological simulant solution, which do not decrease more than 20% across a moisture content LOD of said zirconium phosphate ranging from $0 \leq LOD \leq 18\%$ across a temperature range of up to 200° C.

53. The zirconium phosphate of claim 52 wherein said Kd value does not decrease more than 5% across a moisture content LOD of said zirconium phosphate ranging from $0 \leq LOD \leq 18\%$ across a temperature range of up to 200° C.

54. The zirconium phosphate of claim 52 wherein said capacity is at least 0.70 mMol $NH_4^+$/g.

55. The zirconium phosphate of claim 52 wherein said Kd value is at least 120 mL/g.

56. Hafnium phosphate having stability against moisture loss, wherein said stability against moisture loss is characterized by a capacity and Kd value for $NH_4^+$ ions from a physiological simulant solution, which do not decrease more than 20% across a moisture content LOD of said hafnium phosphate ranging from $0 \leq LOD \leq 18\%$ across a temperature range of up to 200° C.

57. A method of making amorphous zirconium phosphate, comprising the steps of:

preparing an aqueous mixture comprising a water insoluble zirconium compound and a phosphorous-containing reagent, wherein said phosphorus-containing reagent comprises a mixture of a salt of phosphoric acid and soluble silica, wherein a pH of said phosphorus-containing reagent ranges from 3.0 to 6.0, a concentration of phosphate ions in said phosphorus-containing reagent ranges from 0.05 to 2.0 M, and wherein a (P+Si)/Zr molar ratio in said aqueous mixture ranges from 0.2 to 2.2;

heating said aqueous mixture at a temperature of at least 120° C. at autogenous pressure not exceeding 100 psi to form a reaction product;

treating said reaction product with acid at a temperature of at least 60° C.;

neutralizing said reaction product; and filtering, washing and drying said reaction product.

58. The method of claim 57 wherein said reaction product is treated with said acid in an amount that forms an acid/Zr molar ratio of 0.1 to 2.0 and said drying is conducted at a temperature ranging from 100 to 200° C. for 6 to 8 hours.

* * * * *

UNITED STATES PATENT AND TRADEMARK OFFICE
CERTIFICATE OF CORRECTION

PATENT NO. : 6,936,175 B2
DATED : August 30, 2005
INVENTOR(S) : Anatoly I. Bortun et al.

Page 1 of 1

It is certified that error appears in the above-identified patent and that said Letters Patent is hereby corrected as shown below:

Title page,
Item [56], References Cited, OTHER PUBLICATIONS,
"*Inorganic Ion Exchange Materials...*" reference, delete "182", and insert -- 1982 --.
"*The Sorptionof First–Row...*" reference, delete "Sorptionof", and insert -- Sorption of --.
"*Direct hydrothermal Syntesis...*" reference, delete "sysntesis", and insert -- synthesis --.
"*Synthesis and study of New Compounds...*" reference, "$(M^1)(N^{IV})2(PO_4)_3$", and insert -- $(M^1)(N^{IV})_2(PO_4)_3$ --.
"*Hydrothermal Preparation of the Low–Expansion...*" reference, delete "pp. 21-39", and insert -- pp. 31-39 --.

Column 10,
Line 2, delete "Ka", and insert -- Kα --.

Signed and Sealed this

Eighteenth Day of April, 2006

JON W. DUDAS
*Director of the United States Patent and Trademark Office*